July 22, 1941.  S. J. HARLEY ET AL  2,249,898
LINEAR INDEXING MECHANISM
Filed July 17, 1939  5 Sheets-Sheet 4

July 22, 1941.   S. J. HARLEY ET AL   2,249,898
LINEAR INDEXING MECHANISM
Filed July 17, 1939   5 Sheets-Sheet 5

Inventors:
Stanley J. Harley
George Calala
by Richard L. Babcock
Attorney

Patented July 22, 1941

2,249,898

UNITED STATES PATENT OFFICE 2,249,898

LINEAR INDEXING MECHANISM

Stanley Jaffa Harley, Coventry, and George Olah, Birmingham, England

Application July 17, 1939, Serial No. 285,014
In Great Britain April 5, 1938

13 Claims. (Cl. 90—57)

This invention relates to linear indexing mechanism for regulating or controlling pre-determined relative movement between two elements, such as a work-table and a machine frame.

The improved mechanism is applicable for a variety of purposes in which a stepped motion is required including machines for milling or grinding racks; for the production of exact linear scales, and for measuring and other purposes.

The main object of the invention is to obtain the highest possible degree of accuracy for each step of the indexing movement.

According to this invention, the table 2 in its travel under the control or regulation of the indexing mechanism hereof will move progressively step by step from the right toward the left of Figure 1 and each operative individual step indexing movement involves three sub-steps or movements, the same being (a) a contact clearing movement to the left, (b) a linear indexing or feeding movement or adjustment to the left, and (c) a contact restoring movement to the right of the same extent or magnitude as that of sub-step (a) to the left, whereby (a) and (c) cancel each other and leave the linear indexing or feeding movement of sub-step (b) as the net movement of table 2 to the left of Figure 1 for a given indexing movement or operation.

Linear indexing mechanism constructed, arranged and adapted to function in accordance with the present invention comprises a main indexing element having a series of steps, an auxiliary indexing element, main and auxiliary contacting elements co-operating respectively therewith, and means for engaging the auxiliary elements and for disengaging the main elements prior to the indexing movement, and for re-establishing contact of the main elements at the termination of each indexing movement.

The improved mechanism also includes means for varying the extent of the indexing movement of the work-table for each step of the main indexing element and for varying the extent of the circular indexing motion of the latter.

Corrective means are also provided for each step in order to eliminate any inaccuracies in the mechanism.

Provision is also made for preventing wear between contacting parts of the mechanism when relative movement takes place between them.

In the accompanying drawings.

Throughout the drawings like parts are designated by similar reference characters.

Figure 1:
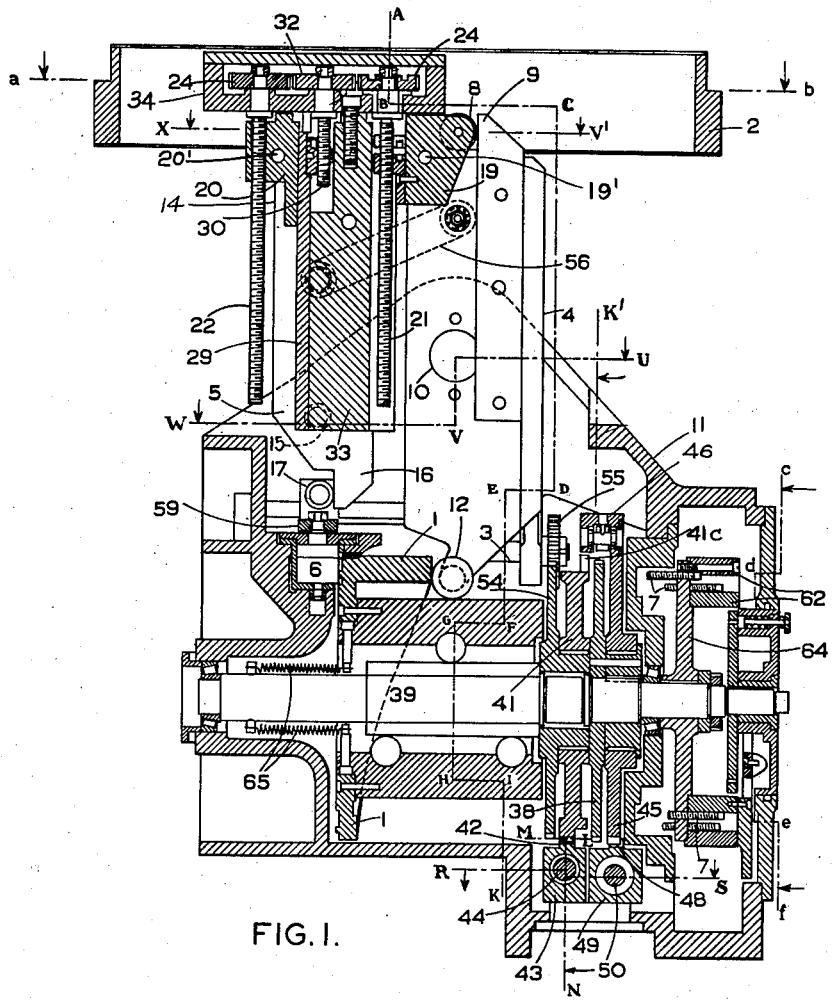
Figure 1 is a longitudinal vertical sectional view of the improved linear indexing mechanism in which the section is taken on line Q—R—S—T of Figure 3 and looking in the direction of the arrows.

Referring to the drawings, the main element of the mechanism consists of a drum 1, Figures 1, 3, 7 and 9, which is provided with a large number of steps 1a along a helical path.

The position of the work-table 2 is determined by means of a main contacting element thereon adapted to make direct or indirect contact with one of the steps 1a of the said drum. The table is moved endwise against the action of a weight (not shown) attached thereto, by means of a lead screw 3. Before the table can be moved and the drum rotated it is necessary to disengage the aforesaid contacting element from the drum, and to engage the leadscrew 3, through auxiliary moving elements with the table, after which the table is moved endwise by the auxiliary moving elements, which are then disengaged and the main contact elements re-engaged as hereinafter described.

As already stated contact between the table and drum may be direct but in order to enable the extent of the indexing movement to be varied at will the contact element on the work-table is preferably actuated by means of a lever 4, hereinafter referred to as the main lever. One arm of this lever operates against a step on the drum 1 whilst the second arm operates against the contact element on the work-table. By varying the ratio of the lever arms the length of each indexing movement can be adjusted.

For the indexing movement an auxiliary lever 5 is employed which is connected with and arranged for adjustment simultaneously with the main lever 4.

The main contacting element linked to the work-table consists of a roll 8 which operates against one arm 9 of the main lever, the other arm of which carries a roll 12 adapted to make contact with one of the steps of the drum, as seen in Figure 1.

Figure 2:
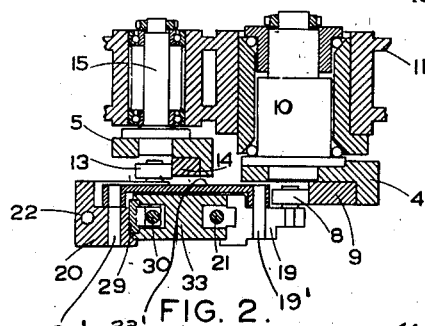
Figure 2 is a transverse section in which the upper part is taken on the line U—V—W of Figure 1 and the lower part on the X—V$^1$ of the same figure and looking in the direction of the arrows.
Figure 7:
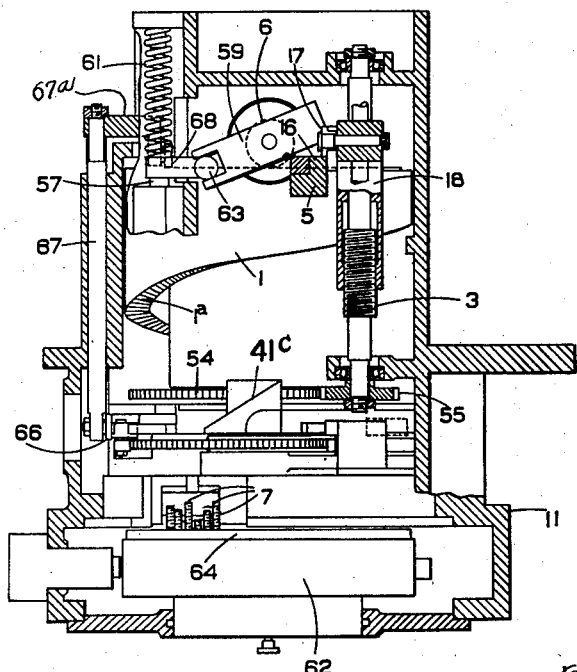
Figure 7 is a horizontal sectional view in which the upper part is taken on the line N—Q$^1$ of Figure 3, the left hand lower part on the line J—L of Figure 4 and the right hand lower part on the line M—N—O—P of Figure 3, looking in the direction of the arrows.

The auxiliary contacting element on the work table 2 consists of a roll 13 operating against one arm 14 of the auxiliary lever 5, Figure 2, the other arm 16 of which operates against a roll 17 carried by a nut 18 on the lead screw 3, Figure 7, which is connected with the drum through gearing.

The main and auxiliary levers 4, 5 are mounted in bearings 10, 15 respectively in the machine bed 11 and are connected together by means of the link 56 hereinafter referred to.

The rolls 8 and 13 on the work-table for the main and auxiliary levers 4, 5 are carried by slides 19 and 20 respectively and means are provided for the simultaneous adjustment of these slides in order to vary the effective lever arm ratio of the two levers. The said adjusting means may consist of screws 21, 22 arranged for operation by gears 24 preferably respectively driven by worms 24a mounted on shaft 23 to turn therewith, Figures 4 and 5. A fine scale 25 on shaft 23 and a rough scale 26 on a shaft 27, on which is mounted to turn therewith a gear 27' driven by a worm 28 turning with a worm drive 28 with shaft 23, indicate the positions of the rolls 8 and 13 and hence the lever arm ratio and the table travel corresponding to one of the steps on the drum 1. The slides 19 and 20 respectively carrying rollers 8 and 13 are connected together by a preferably rigid link 33' spanning the table arm or member 33 and having its respective end portions connected to the respective slides 19 and 20 by any suitable means, such as for instance, pins 19' and 20' respectively. These slides 19 and 20 are to be adjusted axially of their respective positioning screws 21 and 22 to such position as to result in the selected degree of table movement for each intermittent step movement or feed actuation, and as thus adjusted they may be locked in such adjusted position by moving the taper gib 29 endwise as a wedge between the arm or member 33 and slide 20, such action through link 33' moving slide 19 laterally an equal distance and effectually locking both slides 19 and 20 against movement axially of their actuating screws 21 and 22 respectively. As shown, the gib 29 preferably will be operated by a screw 30 through gears 32, 32a and 32b from a suitably arranged shaft 31, gear 32 being keyed to screw 30; gear 32b being mounted on shaft 31 to turn therewith; and gear 32a being loosely mounted on shaft 23 for rotation independently thereof.

Figure 3:
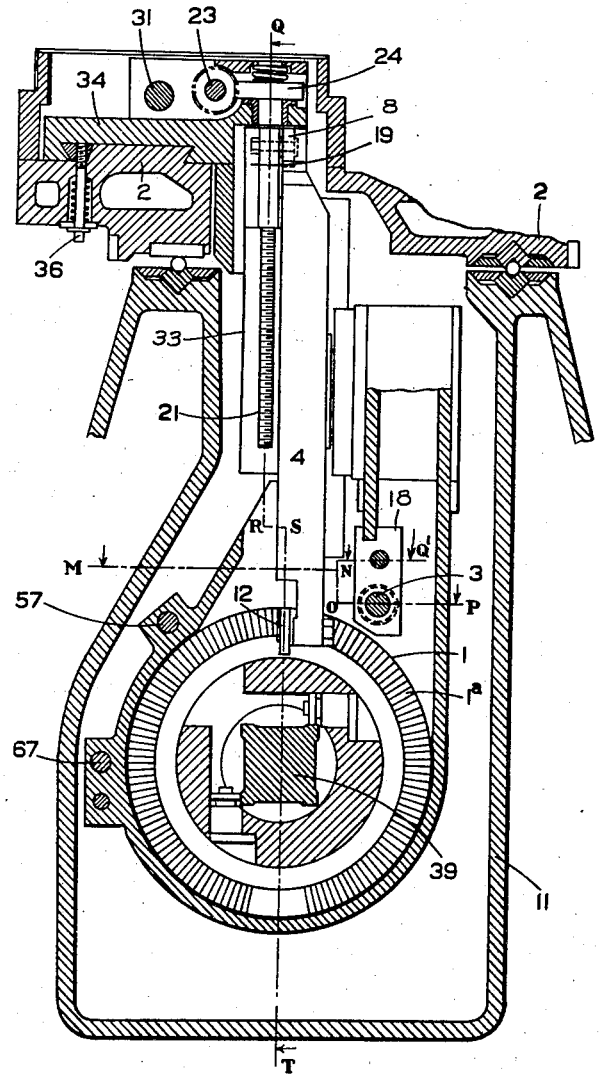
Figure 3 is a vertical transverse sectional view on the line A—B—C—D—E—F—G—H—I—K of Figure 1, looking in the direction of the arrows.
Figure 5:
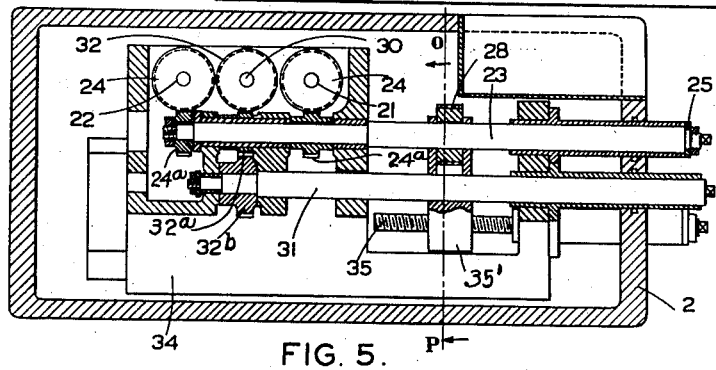
Figure 5 is a transverse section on the line a—b of Figure 1, looking in the direction of the arrows.
Figure 6:
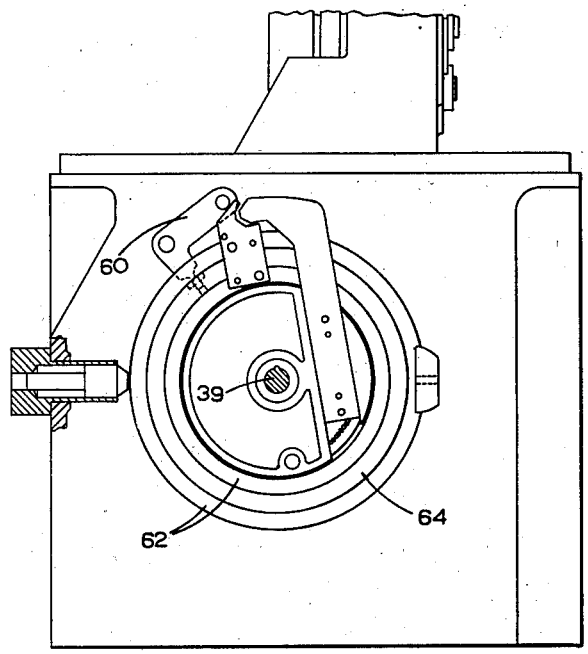
Figure 6 is a vertical section on the line c—d—e—f of Figure 1, looking in the direction of the arrows.

In order to provide for the initial adjustment of the position of the work-table 2 a member 33 carrying the slides 19, 20 aforesaid is itself mounted on a slide 34 which can be actuated by a screw 35 Figure 5 and clamped in any suitable manner, as by means of the screw 36 Figure 3.

Screw 35 is mounted in slide 34 to move therewith (see Fig. 5) and engages in a block 35' (see Figs. 4 and 5), held in fixed position on table 2, to cause movement of slide 34 relative to table 2 in accordance with the extent and direction of rotation of screw 35.

Figure 8:
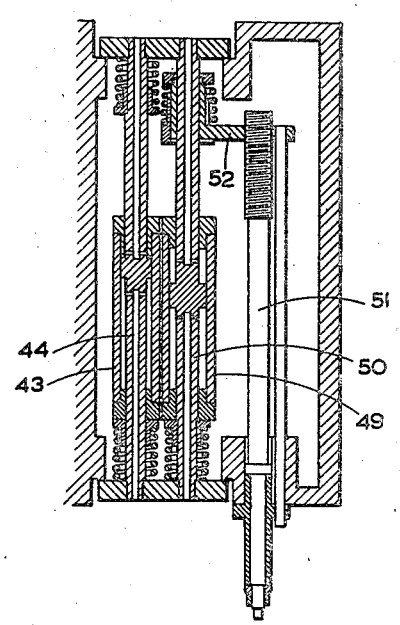
Figure 8 is a transverse section on the line R—S of Figure 1, looking in the direction of the arrows.

The drum 1 is held in one of its operating positions by means of a main index-finger 37 engaging a gear wheel 38 fixed to the drum shaft 39. The engagement and disengagement of this main index is controlled by means of a roll 40 thereon and a main control element or cam 41 having operative cam-faces 41a, 41b, 41c and 41d and adapted for operation by hand or preferably automatically, as shown, by means of a rack 42 operated by the piston 44 of a hydraulic cylinder 43, Figures 1, 4 and 8.

A spring 37a exerts pressure against main index-finger or locking pawl 37, in accordance with usual known spring pressed pawl practice to force it to move into locking engagement with gear 38 when permitted by the relationship of roller 40 to the cam-face 41a and similarly a spring 46a exerts pressure against the auxiliary index-finger or pawl, in accordance with such known practice, to force it to move into engagement with the gear 38 when permitted by the relationship of roller 47 to the cam-face 41b.

Co-operating with the same gear wheel 38 and alternatively with the spring pressed main index or pawl 37 is a spring pressed auxiliary index finger 46 carrying a roll 47 which is also actuated by the main control element or cam 41. This auxiliary index is carried by a member 45 which is adapted to be turned about the axis of the drum shaft by means of a second rack 48 operated by the piston 50 of a hydraulic cylinder 49, Figures 1 and 8.

The circular indexing of the drum 1 may be performed in any suitable manner. During the forward stroke of the first mentioned rack 42 the cam 41 operates to engage the auxiliary index 46 with the gear wheel 38 and to disengage the main index 37 therefrom. This leaves the drum 1 free to be indexed through the prescribed number of steps by the forward movement of the second mentioned rack 48 acting through the auxiliary index 46 and the gear wheel 38 aforesaid. The number of steps through which the drum is indexed can be varied and is determined by the stroke of the second rack 48 which can be adjusted by means of a screw 51 and stop 52 Figure 8.

During the return stroke of the first rack 42 the control element or cam 41 disengages the auxiliary index 46 from the gear wheel 38 and allows the main index 37 to engage therewith. The return stroke of the second rack 48 is an idle stroke, the auxiliary index being disengaged.

Before the drum 1 can be revolved it is necessary to release the main contacting elements from contact with the steps thereof. For this purpose the control element or cam 41 has a bearing in which is disposed a shaft 53 with a small pinion 53a keyed to one end portion thereof and a larger pinion 53b keyed to the other end portion thereof, said shaft 53 with its pinions 53a and 53b constituting the planetary unit of a planetary gear having two sun wheels, one of which is the gear wheel 38 above mentioned. The other sun wheel 54 is loosely mounted about the axis of the drum shaft 39 and when revolved by the planetary gear turns a pinion 55 fixed to the lead screw thus causing the nut 18 on the latter to move axially thereon. The sun gear wheel 38 meshing with small pinion 53a is of greater diameter than sun gear wheel 54 meshing with the larger pinion 53b, their relative diameters and the cooperation between them being such that during the forward stroke of the cam control element or member 41 the said nut is moved in a direction to bring the roll 17 thereon into contact with the auxiliary lever 5, Figure 7. During the continued movement of the control element or cam 41 and nut 18 in the same direction the auxiliary lever 5 is turned about its pivot 15 to bring its other end in contact with the roll 13 on the work table which latter is thereby moved out of contact with the main lever 4, Figure 2.

In order to provide for disengagement of the main lever 4 from the drum 1 the two levers, as shown in Figure 1, are coupled together by means of a link 56 which together with the levers and an imaginary line extending through the frame 11 of the machine from bearing 10 to bearing 15 and intersecting the axes of said bearings 10 and 15 forms a parallelogram. A slight amount of play is allowed between the link and the auxiliary lever 5 to allow the latter to move the table out of contact with the main lever 4. Further movement of the auxiliary lever in the same direction eliminates the play and causes the main lever to be moved out of contact with the drum. By the time the control element or cam 41 has reached the end of its forward movement the main contact elements between the drum and the work-table are cleared and the position of the latter determined by the auxiliary contacting elements, 5, 13.

During the succeeding forward stroke of the second rack 48 the member 45 carrying the auxiliary index 46 is rotated whilst the control element or cam 41 and the axis of shaft 53 remain stationary and the gear wheel 38 aforesaid which is fixed to the drum shaft is revolved by the auxiliary index 46 and its motion transmitted by the planetary gear and loose sun wheel 54 to the lead screw 3 and nut 18. The arrangement is such that for a given number of steps the revolving motion of the drum corresponds with an equivalent motion of the nut, and therefore of the auxiliary contact elements and work-table. During this period of the indexing action the main lever 4 and the main contact elements 8 and 12 remain cleared owing to the link connection between the two levers.

During the return motion of the control element or cam 41 under the influence of its actuating rack 42, the planetary gear 53 and gears 54, 55 effect opposite rotation of the lead screw and a return movement of the nut 18. This will permit the return movement of the levers 4, 5 and the work table 2 under the influence of its weight, not shown. The auxiliary contacts will be cleared and the main contact elements 8, 9, 12 and 1a will be engaged, the main index 37 will be re-engaged with the gear 38 and the auxiliary index 42 be disengaged therefrom. The indexing cycle will be completed by the return stroke of the second rack 48, which however is an idle stroke, as the auxiliary index is disengaged and therefore has no influence on the position of the work table.

The corrective means employed for compensating for inaccuracies in the mechanism comprises a cam or eccentric roll 6 which is arranged to operate against the plane rear surface of the drum 1, Figure 1, and is actuated by means of adjusting screws 7 of which one is provided for each step on the drum, Figure 7. The eccentric roll 6 is actuated by means of a rod 57, one end of which carries a contacting member 60 bearing against one of the adjusting screws 7 Figure 9 whilst the other end, through lug or finger 63 operates a lever 59 keyed to the eccentric roll 6, Figures 1, 4, 7 and 9. The said contacting member 60 is pressed against the adjusting screw 7 by means of a spring 61, Figure 9, and thus determines the angular position of the eccentric roll corresponding to the setting of the adjusting screw. The adjusting screws are all locked by means of the discs 62, Figure 1.

In the first part of the indexing cycle the said contacting member 60 is withdrawn out of contact with the adjusting screw 7 by the co-action between the main control element or cam 41 and a roll 58 on the rod 57 thereby preventing any interference when the drum and with it the adjusting screw carrier 64 on the drum shaft 39 is revolved.

In the working position the drum 1 is pressed axially against the correction eccentric roll 6 by two forces, one of which is derived from a weight (not shown) attached to the work-table and the other from springs 65 attached at one end to the drum 1 and at the other to the drum shaft 39. The angular position of the eccentric roll 6 therefore determines the axial position of the drum and also the exact position of the work-table.

In order to eliminate wear at the contacting surfaces of the drum and the eccentric roll 6 contact between them is cleared before moving the said roll. This is effected by moving the drum axially away from the eccentric roll. For this purpose a bracket 67a on a rod 67 carries a roll 68 bearing against the back of the drum and is moved by the action of the main control element or cam 41 on roll 66 in a direction to press the said roll 68 against the drum, Figures 4 and 7. This action is timed so as to take place after the main contacting elements between the work-table and the drum are cleared.

Operation

One complete cycle of operation of the indexing mechanism involves a forward stroke of cylinder 43 carrying rack 42, such stroke with its resulting operation of parts being the first phase of the full cycle; a forward stroke of the second cylinder 49 carrying rack 48, such stroke with its resulting operation of parts being the second phase of the full cycle; a return stroke to its initial position of cylinder 43 carrying rack 42, such return stroke with its resulting operation of parts being the third phase of the full cycle; and finally, a return stroke to its initial position of cylinder 49 carrying rack 48 to return the support element 45 with auxiliary index or pawl 46, disengaged from gear 38 by the clockwise movement of cam-plate 41 during the immediately preceding third phase of the full cycle of operation, back to its initial position, such return stroke of cylinder 49 being otherwise an idle stroke and being the forth and final phase of the full cycle, whereafter all parts are in proper relation for the initiation of the first phase of the immediately next succeeding cycle of operations wherein the successive phases of the indexing operation are repeated, and so on.

The forward and return strokes of the cylinders 43 and 49 are caused by the admission of fluid under pressure to, and the release of fluid from, the cylinders 43 and 49 respectively in properly timed relation by known operating and control mechanism which may either be hand operated or automatically operated by suitable known means cooperating with some moving part, as for instance, a part of or attachment carried by the grinding or milling machine, and which is not shown and forms no part of the present invention.

INITIAL ADJUSTMENT

To start up operations to mill or grind a given job or work-piece, the adjusting screws 7 are adjusted as may be necessary to compensate for inaccuracies due to wear and/or other causes and are then locked in such adjusted positions by the discs 62.

Figure 4:
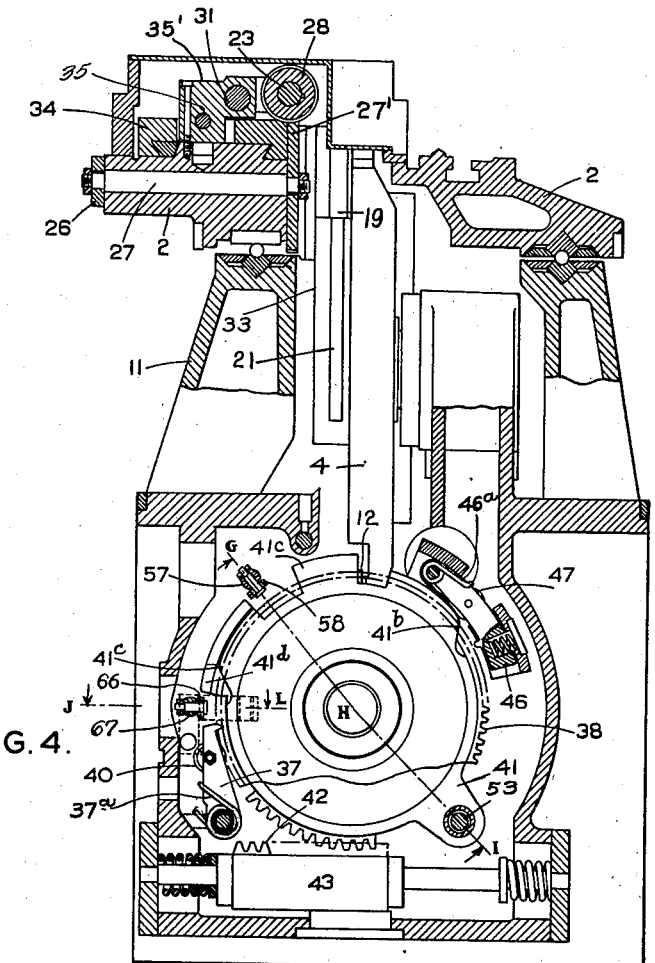
Figure 4 is a vertical transverse sectional view in which the lower part is taken on the line K$^1$—L—M—N of Figure 1 and the upper part on the line O—P of Figure 5, looking in the direction of the arrows.

Then work table 2 is adjusted to its initial position for the job contemplated, such adjustment being accomplished by the manual rotation of adjusting screw 35 which is carried by slide 34 and engages in block 35' relatively fixed with relation to slide 34 and table 2, the rotation of screw 35 forcing the slide 34 and screw 35 toward or away from said block 35', according to the direction of rotation of screw 35, endwise of said screw 35 and of said table 2 (see Figs. 4 and 5). This causes the table arm or member 33 rigidly carried by, and immovable with relation to, slide 34 (see Figs. 1, 3 and 4) to be moved endwise of the table 2 to the desired point of initial adjustment, and when the desired initial adjustment has been obtained the slide 34 is locked or clamped against movement to table 2 by suitable operation of the clamping screw 36 (see Fig. 3). The table arm or element or member 33 will thus be definitely held in fixed position with relation to the table 2 with which it will move thereafter as though integral therewith. Associated with said arm or member 33 and the slide 34 are the respective adjusting screws 21 and 22 journaled in slide 34 and depending closely adjacent the respective side edges of the arm or member 33 and adjustably carrying the slides 19 and 20 respectively adjacent the respective sides of the arm or member 33. Also, the operating screw 30 on which is threaded the slide locking gib 29 is journaled in said slide 34 intermediate the screws 21 and 22, being so positioned as to operate the gib 29 between the slide 20 and the opposed adjacent side face of arm or member 33, all as shown in Figs. 1, 3 and 5.

After the table 2 has been locked or clamped in adjusted position, as above described, the shaft 23 will be rotated in the proper direction to, through worms 24a mounted on shaft 23 to rotate therewith and respectively in driving engagement with the gears 24 respectively mounted on the upper ends of screws 21 and 22 to turn therewith (see Figs. 1, 3 and 5), turn the respective screws 21 and 22 in the proper direction to move their respective slides 19 and 20 (see Figs. 1, 3 and 4) up or down until the desired point of adjustment to obtain the desired throw of the levers 4 and 5 or the desired extent of table movement for a stroke of the levers 4 and 5, has been obtained, which desired point of adjustment will be ascertained by the reading of the fine scale 25 (see Fig. 5) in conjunction with the rough scale 26, which is actuated by the rotation of shaft 23 through the intermediary of the worm 28 mounted on shaft 23 to turn therewith and to engage and drive a pinion or gear 27' mounted on shaft 27 to turn therewith, the said rough scale 26 also being mounted on said shaft 27 to turn therewith (see Fig. 4).

Next, the screw 51 will be rotated in the proper direction to properly position the stop 52 to limit the stroke of cylinder 49 with its rack 48 (see Fig. 8) to obtain the exact degree or extent of angular movement of the drum 1 desired per stroke of the cylinder 49 and its rack 48, or, in other words, the degree of feed movement of the table 2 as measured in steps 1a of the drum 1 intervening between each two successive engagements of the contact roller 12 with the drum 1, as modified, of course, by the position of adjustment of the slides 19 and 20.

With the parts adjusted as above, and with the usual weight (not shown) connected by the usual flexible cable (not shown) and acting to pull and hold the work table 2 toward the right of Fig. 1 to press the main contact upper roller 8 against the upper arm 9 of main lever 4 and the lower main contact roller 12 against a step 1a of drum 1 (see Fig. 1), and with suitable connections (not shown) between the respective ends of the respective stationary pistons 44 and 50 and including the hydraulic control means (not shown) above mentioned, assuming for our purposes that the operator has completed the milling or grinding of one tooth or portion of the work-piece and that the work-piece is now to be moved for the milling or grinding of the next portion of the work-piece, and that the hydraulic control means has been actuated to cause a feeding or indexing movement, the cycle of operation set in motion would be as follows.

FIRST PHASE OF CYCLE

Fluid flowing into the right hand end portion of cylinder 43 (see Figs. 4 and 8) causes it to make a forward stroke to the right of Fig. 4, carrying its rack 42 in mesh with the toothed segment of cam-plate 41 to the right and causing a counter-clockwise movement of the cam-plate 41 (see Fig. 4) of such angular or partial rotary extent as to, in the final part of such movement, simultaneously disengage main or locking index or pawl 37 from gear 38 and permit the engagement of auxiliary index or pawl 46 with said gear 38. Such manipulation of said indexes or pawls is accomplished by the cam-face 41a engaging roller 40 of main index or pawl 37 and forcing it outward in a radial direction with respect to shaft 39 and gear 38 until it is disengaged from the gear 38; and by the moving of the inclined cam-face 41b to be engaged by the roller 47 which moves in a direction radially inward with relation to the shaft 39 and the gear 38 under the influence of the spring 46a acting on pawl 46 as permitted by the form of cam-face 41b until auxiliary index or pawl 46 engages between teeth of gear 38 to connect or lock gear 38 with support element 45 for partial rotary counter-clockwise movement during the second phase of the cycle of operation. However, until the final stage of such counter-clockwise movement of cam-plate 41 the main index or locking pawl 37 remains in engagement with gear wheel 38 and holds or locks said gear wheel 38 against angular or partial rotary movement relative to the axis of shaft 39.

*Preliminary main contact clearance*

In such counter-clockwise movement the cam-plate 41 carries with it in an arcuate movement pinion shaft 53 with its small pinion 53a keyed thereto and meshing with and rotated by the gear teeth of the then stationary gear 38 about a segment of which pinion 53a moves, thus rotating pinion shaft 53. A larger pinion 53b keyed to the other end portion of said pinion shaft 53 and meshing with the teeth of idle or loosely mounted sun wheel gear 54 acts as a drive gear or pinion to drive gear wheel 54 (see Fig. 9), and gear wheel 54 being in driving mesh with pinion 55 (see Figs. 1 and 7) mounted on lead screw 3 to turn therewith causes the screw 3 to turn in the proper direction to, through its engagement with the nut or block 18 carrying roller 17, pull roller 17 into engagement with the lower arm of lever 5 (see Figs. 1 and 7) and swing the lever 5 on its pivot 15 (see Figs. 1 and 2) to cause the upper arm 14 of lever 5 to engage roller 13 and force roller 13 and through the latter the slides 19 and 20, table arm or member 33, and table 2 toward the left to move main contact roller 8 out of contact with the upper arm 9 of lever 4 preparatory to the initiation of swinging movement of the latter to swing lower main contact roller 12 to the right or forward away from the stepped face of drum 1 (see Fig. 1), such initial swinging movement of lever 5 without moving lever 4 being permitted by the slight play or loose motion between link 56 and the auxiliary lever 5 as previously mentioned.

With such play or loose movement between link 56 and lever 5 taken up or eliminated by the initial movement of lever 5 and contact between main contact roller 8 and the upper arm 9 of main lever 4 cleared to avoid wear, this phase of the cycle continues with the continued counter-clockwise movement of cam-plate or control element 41 and the thus continued rotation of pinion 55 and lead screw 3 in the same direction of rotation, resulting in continued swinging movement of auxiliary lever 5 and the simultaneous swinging movement of main lever 4 in the same direction with the resultant forward swinging of lower arm of lever 4 to the right of Fig. 1 until engagement between main contact roller 12 and the particular step 1a of drum 1 theretofore engaged by roller 12 has been cleared and said main contact roller 12 has swung forward to the right so as to be spaced so far from the stepped face of drum 1 as not to obstruct, or be contacted by, the drum 1 as the latter, to eliminate wear, is moved axially forward or to the right during this first phase of the cycle of operation, the work table 2 being held against the pull of the weight, not shown, by the contact between roller 17 and the lower end or arm of lever 5 (see Fig. 1) and between the upper arm 14 of auxiliary lever 5 and the roller 13 (see Fig. 2), lever 5 being journaled at 15 in frame 11 (see Figs. 1 and 2) and roller 13 being adjustably carried by slide 20 associated with and locked to arm or member 33 of the movable work table 2 and moving therewith (see Figs. 1, 2, 3, 4 and 5).

The length of the operative stroke of cylinder 43 and the relative sizes or diameters of the gears 38 and 54 and of small pinion 53a, larger pinion 53b and pinion 55 and the pitch of the thread of lead screw 3 are all so related and proportioned that the above sub-phase of the first phase of the cycle of operation is completed between the inception of the counter-clockwise movement of cam-plate 41 and the completion of such movement with the substantially simultaneous disengagement of the main index or pawl 37 from gear 38 and the engagement of auxiliary index or pawl 46 with said gear 38.

*Clearance of member 60, also of eccentric roll 6*

Figure 9:
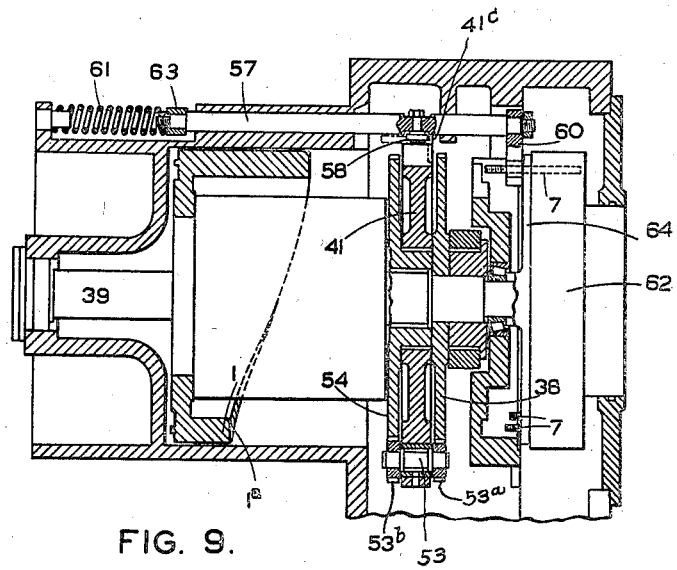
Figure 9 is a longitudinal section on the line G—H—I of Figure 4, looking in the direction of the arrows.

Also, during said first phase of the cycle of operation, during the counter-clockwise movement of cam-plate 41, the cam-face 41c thereof (see Figs. 4 and 7) strikes roller 58 and forces it, together with rod 57 (see Figs. 4 and 9) and contacting member or foot 60 carried by rod 57 (see Fig. 9), rearward away from adjusting screws 7 against the opposition of helical spring 61 (see Fig. 9). A lug or finger 63 (see Figs. 7 and 9) secured to the rear portion of rod 57 against relative movement endwise thereof (see Fig. 9) fits into the bifurcated end of a cross-head or lever 59 (see Fig. 7) keyed to the stem of eccentric roll 6 (see Figs. 1 and 7) or otherwise secured thereto to turn therewith causes the eccentric roll 6 to be partially rotated simultaneously with the endwise movement of rod 57 and the hereinafter mentioned reverse endwise movement of rod 67, whereby as the rods 57 and 67 move endwise in reverse directions to move contacting member 60 away from adjusting screws 7 and the drum 1 is moved axially forward or to the right to release its pressure on eccentric roll 6, the eccentric roll 6 is partially rotated to release its pressure on the end of drum 1.

*Axial movement of drum 1 to eliminate wear*

Practically simultaneously with the engagement of roller 58 by cam-face 41c referred to in the immediately preceding paragraph, the cam-face 41d of cam-plate 41 engages roller 66 carried by rod 67 (see Figs. 4 and 7), the cam-face 41d being so formed (see Fig. 4) as to force the roller 66 forward in the direction of the screws 7, or in a direction reverse to that of the movement of rod 57. An arm or bracket 67a preferably rigidly secured to rod 67 and held thereto against relative axial movement (see Fig. 7) bears, by means of a roller 68 carried by the foot or tip of arm or bracket 67a (see Fig. 7), against the rear or plane face of drum 1 so that as the cam-face 41d engages roller 66 and forces it and rod 67 forward the roller 68 will be forced against the rear face of drum 1 and will move the drum 1 axially forward to the right and so will definitely clear contact between, or separate, the plane or rear face of drum 1 from the adjacent face portion of eccentric roll 6, thus preventing wear producing frictional contact between eccentric roll 6 and the plane or rear face of drum 1 during most of the partial rotary movement of eccentric roll 6 and during the succeeding phase of the operative cycle wherein the drum 1 is given a partial rotary or indexing movement.

When the cylinder 43 has completed its forward stroke or stroke toward the right hand of Fig. 4, it remains in such extreme forward or right hand position until after the cylinder 49 has completed its forward stroke or stroke toward stop 52 (see Fig. 8) and thus the rack 42 carried by cylinder 43, being in mesh with the toothed segment of cam-plate 41, holds cam-plate 41 and the axis of shaft 53 against movement about the axis of shaft 39 until the second phase of the cycle of operation has been completed.

SECOND PHASE

With the main or locking index or pawl 37 moved by cam-face 41a to inoperative position and auxiliary index or pawl 46 in operative engagement with gear 38, thus operatively connecting or locking supporting element 45 and gear 38 to turn together about the axis of shaft 39, fluid now enters the right hand end of auxiliary hydraulic cylinder 49 (see Fig. 8, whereof the portion adjacent Fig. 9 is considered the right hand end) and forces cylinder 49 with its rack 48 carried thereby bodily toward stop 52, and thus causes the supporting element 45 to make a counter-clockwise partial rotation or rotary movement of an extent depending upon the length of stroke of cylinder 49 which in turn is regulated by the stop 52 due to the meshing of the rack 48 carried by cylinder 49 with the toothed segment of supporting element 45.

Gear 38 being thus connected or locked to supporting element 45 will make a counter-clockwise partial rotation of the same extent as the counter-clockwise movement of supporting element 45.

The counter-clockwise movement of gear 38 causes a partial rotation of shaft 39 to which it is keyed (see Fig. 1), causing an indexing partial rotation of drum 1 which is mounted on shaft 39 to turn therewith (see Fig. 3) though capable of axial movement relative thereto (see Fig. 1), the extent of such indexing partial rotary movement of drum 1 being determined by the length of the stroke of the cylinder 49, which in turn is determined by the point of adjustment of the stop 52.

During this second phase the cam-plate or control element 41 will be held in fixed position and consequently the axis of shaft 53 will be held in fixed position and the sun gear 38 in mesh with small pinion 53a will rotate the same together with shaft 53 and the larger pinion 53b as said gear 38 makes its oscillatory counter-clockwise movement during this second phase of the cycle of operation. Such rotation of the larger pinion 53b during this second phase of the cycle serves to partially rotate the small sun gear wheel 54 and, by the latter, to rotate the pinion 55 and lead screw 3 sufficiently to move the block 18 with its roller 17 endwise of the lead screw 3 forward or to the right a distance equal to, or substantially equal to, or bearing a definite relation to, the distance between the forward face of the particular step 1a of the drum 1 engaged by the lower main contact roller 12 prior to the initiation of the first phase of the cycle of operation and the forward face of the particular step 1a of said drum 1 to be engaged by the said roller 12 during the third phase of the same cycle of operation.

When the cylinder 49 has completed its forward stroke, or stroke to the right toward the stop 52 (see Fig. 8), it remains in such extreme forward or right hand position until after the cylinder 43 has completed its return stroke or stroke toward the left (see Fig. 4), and thus the rack 48 carried by cylinder 49, being in mesh with the toothed segment of supporting element 45, will hold carrier or supporting element 45 against partial rotary movement about the axis of shaft 39 until the third phase of the cycle of operation has been completed. Likewise, the auxiliary index or pawl 46, being still engaged with gear wheel 38 and mounted on supporting element 45, will hold gear wheel 38 in fixed position against movement about the axis of shaft 39 until the third phase of the cycle of operation has been completed.

Third Phase

The drum 1 having now been given a partial rotary movement to its new indexing position, and the block or nut 18 with its roller 17 having been moved correspondingly forward or to the right, fluid now enters the left hand end (see Figs. 4 and 8) of cylinder 43 and forces cylinder 43 with its rack 42 to make a return stroke to the left to its initial position, causing a reverse or clockwise movement of the cam-plate or control element 41 to its initial position by the engagement of the rack 42 with the toothed segment of said cam-plate or control element 41.

Such reverse or clockwise movement of cam-plate or control element 41 sets in operation the groups of mechanism to achieve the purposes as follows:

Clearance of auxiliary contacts, re-engagement of main contacts

The shaft 53 with its pinions 53a and 53b is moved in an arc in a clockwise direction about the axis of shaft 39 and pinion 53a being in mesh with the now stationary gear 38 is thereby rotated together with its shaft 53 which thus rotates in the same direction pinion 53b meshing with idler gear or sun wheel 54 to rotate that (see Fig. 9) and thereby drive pinion 55 (see Fig. 1) in the proper direction to move the block 18 and the auxiliary contact roller 17 carried thereby to the left, thus permitting auxiliary lever 5 and main lever 4, though the action of connecting link 56, to swing back toward the vertical under the pull of the usual weight, not shown, their upper arms swinging toward the right in Fig. 1 and their lower arms swinging toward the left in said figure, this resulting in the main contact roller 12 engaging a step 1a of the drum 1 in its newly indexed position, followed by the firm contact of main contact upper roller 8 with the upper arm 9 of main lever 4 (see Figs. 1 and 2) and the clearance of contact between the upper arm 14 of auxiliary lever 5 and the auxiliary upper contact roller 13 (see Figs. 1 and 2).

This third operative phase of the cycle is just the reverse of the first operative phase and the reverse or left hand stroke or movement of the block 18 with its auxiliary contact roller 17 is the same in extent or degree as its right hand stroke in the first phase of the cycle.

Return to normal operative positions of member 60 and eccentric roll 6

Also, during said third phase of the cycle of operations the cam-plate 41 moving clockwise or reversely to its first phase direction of movement, moves cam-face 41c out of engagement with roller 58 carried by rod 57 and thereby frees rod 57 to be moved endwise by the spring 61 forward to its normal or initial position, thus moving contacting member 60 into contact with the newly advanced adjusting screw 7 corresponding to the new step 1a now engaged by the lower main contact roller 12 in the newly indexed position of the drum 1, such engagement between contact member 60 and said adjusting screw 7 limiting the forward endwise movement of rod 57 and thus determining the angular position to which the eccentric roll 6 is simultaneously moved by reason of the swinging movement of lever or cross-head 59 due to the movement of lug or finger 63 engaging in the bifurcated end of said lever or cross-head 59 and moving bodily with said rod 57 in a direction endwise of the latter.

Axial movement of drum 1 to re-engage with eccentric roll 6

Practically simultaneously with the disengagement of roller 58 by cam-face 41c, the cam-face 41d moves out of engagement with the roller 66 of rod 67 (see Fig. 4) and thus frees rod 67 to be moved rearwardly back to its initial position by the engagement between the roller 68 carried by arm or bracket 67a of said rod 67 and the plane or rear face of the drum 1 (see Fig. 7) as the latter is pulled or pressed against the face of the eccentric roll 6 (see Figs. 1 and 7) by the springs 65 (see Fig. 1) and the action of the weight (not shown) applied through the engagement of upper main contact roller 8 with upper arm 9 of main lever 4 acting to swing said upper arm 9 to the right and tending to swing the lower arm of lever 4 to the left and pressing the lower main contact roller 12 against a step 1a of the indexing end or face of drum 1 and forcing the rear or plane face of said drum 1 firmly against the eccentric roll 6, all as shown in Fig. 1.

*Disengagement of pawl 46, re-engagement of pawl 37*

As the end of the return or left-hand stroke of cylinder 43 is approached the respective rollers 40 and 47 of the respective main index or pawl 37 and the auxiliary index or pawl 46 will be engaged by the cam-faces 41a and 41b, the roller 40 moving down cam face 41a and radially inward toward the axis of gear 38 under the pressure and action of spring 37a and the roller 47 moving up cam-face and radially outwardly away from the axis of gear 38 against the pressure of spring 46a, such respective radial inward and outward movement of the respective rollers 40 and 47 continuing until the end of the clockwise movement of the cam-plate 41, at which time such reverse movement of the rollers 40 and 47 will have resulted in permitting the main index or pawl 37 to engage and lock gear wheel 38 against movement about the axis of the shaft 39 and in substantially simultaneously forcing auxiliary index or pawl 46 out of engagement with said gear 38 so as to disconnect gear 38 and support element 45 preparatory to the fourth and final phase of the cycle of operation.

FOURTH AND FINAL PHASE

The table 2 having thus been advanced one step involving the partial rotary or indexing movement of the drum 1, and all other parts, except the cylinder 49 with its rack 48 and support element 45 with its auxiliary index or pawl 46, having been returned to operative position in readiness for the initiation of the first phase of the immediately next succeeding cycle of operations, fluid now enters the left hand end (Fig. 8) of cylinder 49 and forces it to make a left hand or return stroke to, through engagement of its rack 48 with the toothed segment of support element 45, cause a reverse or clockwise partial rotary movement of support element 45, with the auxiliary index or pawl 46 carried thereby, back to its original position, at which time all elements of the mechanism will be in proper position for the initiation of the first phase of the immediately next succeeding cycle of operation.

Of course, after the cylinder 43 has made its left-hand or return stroke to its initial position simultaneously with the completion of the third phase of the cycle of operation it remains in that position until the cylinder 49 has made its left-hand or return stroke to its initial position simultaneously with the completion of the fourth phase of the cycle of operation and it remains in that position until the cylinder 43 has completed its right hand or forward stroke of the first phase of the next succeeding cycle of operation.

We claim:

1. Indexing mechanism for causing the travel of a work-table along a fixed frame with a regulated step by step movement, said mechanism comprising in combination a main indexing element having a series of steps, an auxiliary indexing element, main and auxiliary contacting elements co-operating therewith, fixed and loose gear wheels operatively associated with said main and auxiliary indexing elements respectively, main and auxiliary index fingers, a carrier for the auxiliary index finger, means for oscillating said carrier, a cam for moving said fingers alternately into and out of engagement with said fixed gear wheel, planet pinions carried by said cam and in constant mesh respectively with said fixed and loose gear wheels and means for oscillating said cam independently of and alternately with the oscillations of said carrier.

2. Linear indexing mechanism for regulating the movement of a table along a fixed frame comprising in combination a drum rotatably mounted in said frame and having a helical series of steps, a lead screw rotatably mounted in said frame in geared relation with said drum, a nut working on said lead screw, a lever pivotally mounted in said frame and having one arm co-operating with said nut and the other arm with said table, a second lever pivoted in said frame and having one arm co-operating with said drum and the other arm with said table, and means for actuating said lead screw and nut and for indexing said drum.

3. Linear indexing mechanism for controlling the movement of a table along a fixed frame comprising in combination a drum rotatably mounted in said frame and having a helical series of steps, a lead screw rotatably mounted in said frame in geared relation with said drum, a nut working on said lead screw, a lever pivotally mounted in said frame and having one arm co-operating with said nut and the other arm with said table, a second lever pivoted in said frame and having one arm co-operating with said drum and the other arm with said table, means for simultaneously adjusting the ratio of the arms of both levers to vary the extent of the linear indexing motion, and means for actuating said lead screw and nut and for indexing said drum.

4. Linear indexing mechanism for regulating the movement of a table along a fixed frame comprising in combination a drum rotatably mounted in said frame and having a helical series of steps, a lead screw rotatably mounted in said frame in geared relation with said drum, a nut working on said lead screw, a lever pivotally mounted in said frame and having one arm co-operating with said nut and the other arm with said table, a second lever pivoted in said frame and having one arm co-operating with said drum and the other arm with said table, means for simultaneously adjusting the ratio of the arms of both levers to vary the extent of the linear indexing motion, means connecting said levers together with a limited degree of play, a control element, means controlled by said control element for actuating said lead screw and for indexing said drum and means for oscillating said cam.

5. Linear indexing mechanism for regulating the movement of a table along a fixed frame comprising in combination a drum rotatably mounted in said frame and having a helical series of steps, a lead screw rotatably mounted in said frame in geared relation with said drum, a nut working on said lead screw, a lever pivotally mounted in said frame and having one arm co-operating with said nut and the other arm with said table, a second lever pivoted in said frame and having one arm co-operating with said drum and the other arm with said table, means for simultaneously adjusting the ratio of the arms of both levers to vary the extent of the linear indexing motion, means connecting said levers together with a limited degree of play, a control element having an oscillatory motion on said drum shaft and means controlled by said control element for engaging the auxiliary contacting element and for disengaging the main elements prior to the indexing motion and for re-establishing contact of the main elements at the termination of each indexing movement.

6. Linear indexing mechanism for regulating the movement of a slide along a fixed frame, comprising in combination a main indexing element including a shaft rotatably mounted in the said frame and a drum mounted on and rotatable with said shaft and having a helical series of steps, an auxiliary indexing element consisting of a lead screw rotatably mounted in said frame and carrying an axially movable nut, a main contacting element consisting of a lever pivoted in said frame and co-operating with said slide and with the steps of said drum, an auxiliary contacting element consisting of a lever pivoted in said frame and co-operating with said slide and with the nut of said lead screw, fixed and loose gear wheels mounted on said drum shaft, main and auxiliary index fingers adapted for alternate engagement with said fixed gear wheel, a carrier for said auxiliary index finger loosely mounted on said shaft, a control element rotatably mounted on said drum shaft in operative relation with said index fingers, planet pinions carried by said control element and in constant mesh respectively with said fixed and loose gear wheels, and means for imparting alternate oscillatory motions to said control element and to the carrier of said index fingers.

7. Linear indexing mechanism of the character described, including a main indexing element consisting of a rotatable drum having a helical series of steps, means for correcting the axial position of said drum for each of the steps thereof, and means for holding said drum against angular movement after each of its successive angular indexing movements.

8. Linear indexing mechanism of the character described, including a main indexing element consisting of a rotatable drum having a helical series of steps, a series of adjustable screws for correcting the axial position of the drum for each step thereof, a carrier for said screws rotatable with said drum, an eccentric adapted to move said drum towards said screws, a cam and means operated by said cam for rotating said eccentric.

9. Linear indexing mechanism of the character described, including a main indexing element consisting of a rotatable drum having a helical series of steps, a series of adjustable screws for correcting the axial position of the drum for each step thereof, a carrier for said screws rotatable with said drum, an eccentric adapted to move said drum towards said screws, a cam and means operated by said cam for rotating said eccentric, and for moving the drum axially away from said eccentric prior to the rotation thereof.

10. Linear indexing mechanism for controlling the movement of a table along a fixed frame comprising in combination a drum rotatably mounted in said frame and having a helical series of steps, a lead screw rotatably mounted in said frame in geared relation with said drum, a nut working on said lead screw, a lever pivotally mounted in said frame having one arm co-operating with said nut and the other arm with said table, a second lever pivoted in said frame and having one arm co-operating with said drum and the other arm with said table, rollers mounted adjustably on said table as contacts for said levers, means for effecting simultaneous and equal adjustment of said rollers, means for locking said adjusting means and means for actuating said lead screw and for indexing said drum.

11. Linear indexing mechanism for moving a table along a frame, including roller contacts adjustably mounted on said table, adjusting and locking means therefor, main and auxiliary indexing elements rotatably mounted in said frame and comprising a drum having a helical series of steps and a lead screw carrying a nut respectively, main and auxiliary contacting elements each consisting of a lever pivoted in said frame, one of said levers co-operating with the steps of said drum and with one of the roller contacts on said table and the other lever co-operating with the nut on said lead screw and with the other roller contact on said table, means connecting said levers together with a limited degree of play and means for alternately engaging and disengaging contacts between said levers and their co-operating parts and for rotating said drum.

12. Linear indexing mechanism for moving a table along a frame, including roller contacts adjustably mounted on said table, adjusting and locking means therefor, main and auxiliary indexing elements rotatably mounted in said frame and comprising a drum having a helical series of steps and a lead screw carrying a nut respectively, main and auxiliary contacting elements each consisting of a lever pivoted in said frame, one of said levers co-operating with the steps of said drum and with one of the roller contacts on said table and the other lever co-operating with the nut on said lead screw and with the other roller contact on said table, means connecting said levers together with a limited degree of play, fixed and loose gear wheels operatively associated with said drum and lead screw respectively, main and auxiliary index fingers, a loosely mounted carrier for said auxiliary finger, a control element, planetary pinions carried by said control element and engaging said fixed and loose gear wheels, a rack for oscillating said control elements for alternately engaging and disengaging said index fingers with the fixed gear wheel, means for operating said rack, a second rack for oscillating said carrier alternately with the oscillations of said control element and means for operating said second rack.

13. Linear indexing mechanism for causing the travel of a work-table along a fixed frame with a regulated step by step movement, said mechanism comprising a main indexing element, a pivotally mounted member having arms extending on different sides of the axis of its pivot and normally engaging and pressing against said element with one of said arms while its other arm is pressed by said table in a direction to urge its first mentioned arm into contact with said element, in combination with means for intermittently actuating said element to move it to an indexing position, and mechanism correlated to said means and operable for disengaging said member from said element and relieving said member from the pressure normally exerted thereon by said table prior to an actuation of said element, for thereafter moving said table to its newly indexed position between the disengagement and reengagement of said member with said element, and for, finally, permitting the reengagement of said member with said element after the indexing actuation of said element has been completed.

STANLEY J. HARLEY.
GEORGE OLAH.